US008381193B2

(12) United States Patent
Cervantes

(10) Patent No.: US 8,381,193 B2
(45) Date of Patent: Feb. 19, 2013

(54) APPARATUS, SYSTEM, AND METHOD FOR VISUAL LOG ANALYSIS

(75) Inventor: Ezequiel Cervantes, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 824 days.

(21) Appl. No.: 11/851,257

(22) Filed: Sep. 6, 2007

(65) Prior Publication Data

US 2009/0070455 A1 Mar. 12, 2009

(51) Int. Cl.
*G06F 11/32* (2006.01)
*G06F 11/34* (2006.01)

(52) U.S. Cl. ........ 717/131; 717/155; 717/121; 717/128; 715/204

(58) Field of Classification Search .................. 715/700; 395/704; 726/9
See application file for complete search history.

(56) References Cited

U.S. PATENT DOCUMENTS

| | | | | |
|---|---|---|---|---|
| 5,740,440 | A | 4/1998 | West | 395/704 |
| 5,819,094 | A * | 10/1998 | Sato et al. | 717/131 |
| 5,847,972 | A | 12/1998 | Eick et al. | 364/514 |
| 6,664,988 | B1 | 12/2003 | Rollins | 345/853 |
| 6,917,972 | B1 * | 7/2005 | Basko et al. | 709/224 |
| 7,010,586 | B1 * | 3/2006 | Allavarpu et al. | 709/223 |
| 7,240,364 | B1 * | 7/2007 | Branscomb et al. | 726/9 |
| 7,337,473 | B2 * | 2/2008 | Chang et al. | 726/27 |
| 7,349,960 | B1 * | 3/2008 | Pothier et al. | 709/224 |
| 7,373,612 | B2 * | 5/2008 | Risch et al. | 715/850 |
| 2003/0033402 | A1 * | 2/2003 | Battat et al. | 709/224 |
| 2004/0057389 | A1 * | 3/2004 | Klotz et al. | 370/252 |
| 2005/0177790 | A1 | 8/2005 | Molander et al. | 715/700 |
| 2006/0005080 | A1 | 1/2006 | Walker et al. | 714/38 |

OTHER PUBLICATIONS

Jan Valdman, "Log File Analysis", Technical Report No. DCSE/TR-2001-04, http://www.kiv.zcu.cz/publications/ , Jul. 2001.
Tetsuji Takada et al., "Mielog: A Highly Interactive Visual Log Browser Using Information Visualization and Statistical Analysis", Proceedings of LISA 2002: 16th Systems Administration Conference, Philadelphia PA, Nov. 3-8, 2002.
"Visual Log", http://www.archive.org/details/tucows_322925_Visual_Log, Feb. 8, 2007.
"Visual Logparser 1.0", http://visual-logparser.serialcoder.qarchive.org, Feb. 8, 2007.

* cited by examiner

*Primary Examiner* — Asad Nawaz
*Assistant Examiner* — Jason Harley
(74) *Attorney, Agent, or Firm* — Kunzler Law Group, PC

(57) ABSTRACT

An apparatus, system, and method are disclosed for visual log analysis. The apparatus for visual log analysis is provided with a plurality of modules configured to functionally execute the necessary steps of retrieving log entries from a plurality of devices on a network, parsing the log entries to determine an execution flow of commands executed of the network, and displaying a graphical representation of such execution on the network. These modules in the described embodiments include a log consolidation module, a parsing module, and a display module.

17 Claims, 6 Drawing Sheets

APPARATUS, SYSTEM, AND METHOD FOR VISUAL LOG ANALYSIS

BACKGROUND OF THE INVENTION

1. Field of the Invention

This invention relates to network management systems and more particularly relates to an apparatus, system, and method for visual log analysis.

2. Description of the Related Art

Various computer and network devices generate log records of transactions between devices, device operations, and errors. Unfortunately, the format and content of the logs are not standardized. The differences in log content and format may be particularly great between different device manufacturers. The problem may be further compounded when application log files are considered. Application log files may contain information regarding particularized operations that are only significant for one application. Understanding database log files may present an even greater challenge because of the large number of data transactions and loggable events that take place in conjunction with a database.

A network manager or network management system may manage several network, computer devices, and/or databases simultaneously. These devices may host or work in conjunction with multiple applications. If a network or application error occurs, the network manager may want to view the various log files to determine a root cause of the error. Unfortunately, the log files may be difficult to read, especially where the network contains devices and applications from more than one manufacturer or developer.

One common answer to this problem is a log analyzer. A log analyzer may automatically scan through an imported log file to provide information regarding a failure to a network administrator. Unfortunately, since log file formats are not standardized, a separate analyzer is typically required for each device or application. Moreover, the analysis reports may still be difficult to decipher, because the format of the analysis report may not be intuitive.

SUMMARY OF THE INVENTION

The present invention has been developed in response to the present state of the art, and in particular, in response to the problems and needs in the art that have not yet been fully solved by currently available network management systems. Accordingly, the present invention has been developed to provide an apparatus, system, and method for visual log analysis.

The apparatus for visual log analysis is provided with a plurality of modules configured to functionally execute the necessary steps of retrieving log entries from a plurality of devices on a network, parsing the log entries to determine a status of the network, and displaying a graphical representation of the status of the network. These modules in the described embodiments include a log consolidation module, a parsing module, and a display module.

In a further embodiment, the parsing module may additionally read metadata information stored with the log entries to identify a topology of the plurality of devices on the network. In such an embodiment, the display module may graphically display the topology of the plurality of devices on the network.

In another embodiment, the parsing module may identify a flow of interactions between the plurality of devices on the network. In this embodiment, the display module may display the flow of interactions between the plurality of devices on the network. In these described embodiments, the parsing module may be further configured to parse log entries stored in a plurality of formats by the plurality of devices on the network.

In another embodiment, the apparatus for visual log analysis may be configured to identify a loggable event, generate a log entry documenting the loggable event, and store metadata information with the log entry, wherein the metadata information is configured to be readable by a visual log manager. In this embodiment, the apparatus may include an event identification module, a log generator, and a metadata writer.

A system for visual log analysis is also presented. The system, in the described embodiments, may include a network, a plurality of devices in communication with the network, and a visual log manager in communication with the network. In one embodiment, the plurality of devices in communication with the network may identify a loggable event, generate a log entry documenting the loggable event, and store metadata information with the log entry, wherein the metadata information is configured to be readable by a visual log manager. In such an embodiment, the a visual log manager may then retrieve log entries from the plurality of devices in communication with the network, parse the log entries to determine a status of the network, and display a graphical representation of the status of the network.

A method of the present invention is also presented for visual log analysis. The method in the disclosed embodiments substantially includes the steps necessary to carry out the functions presented above with respect to the operation of the described apparatus and system. In one embodiment, the method includes retrieving log entries from a plurality of devices on a network, parsing the log entries to determine a status of the network, and displaying a graphical representation of the status of the network.

The method also may include identifying a loggable event, generating a log entry documenting the loggable event, and storing metadata information with the log entry, wherein the metadata information is configured to be readable by a visual log manager.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
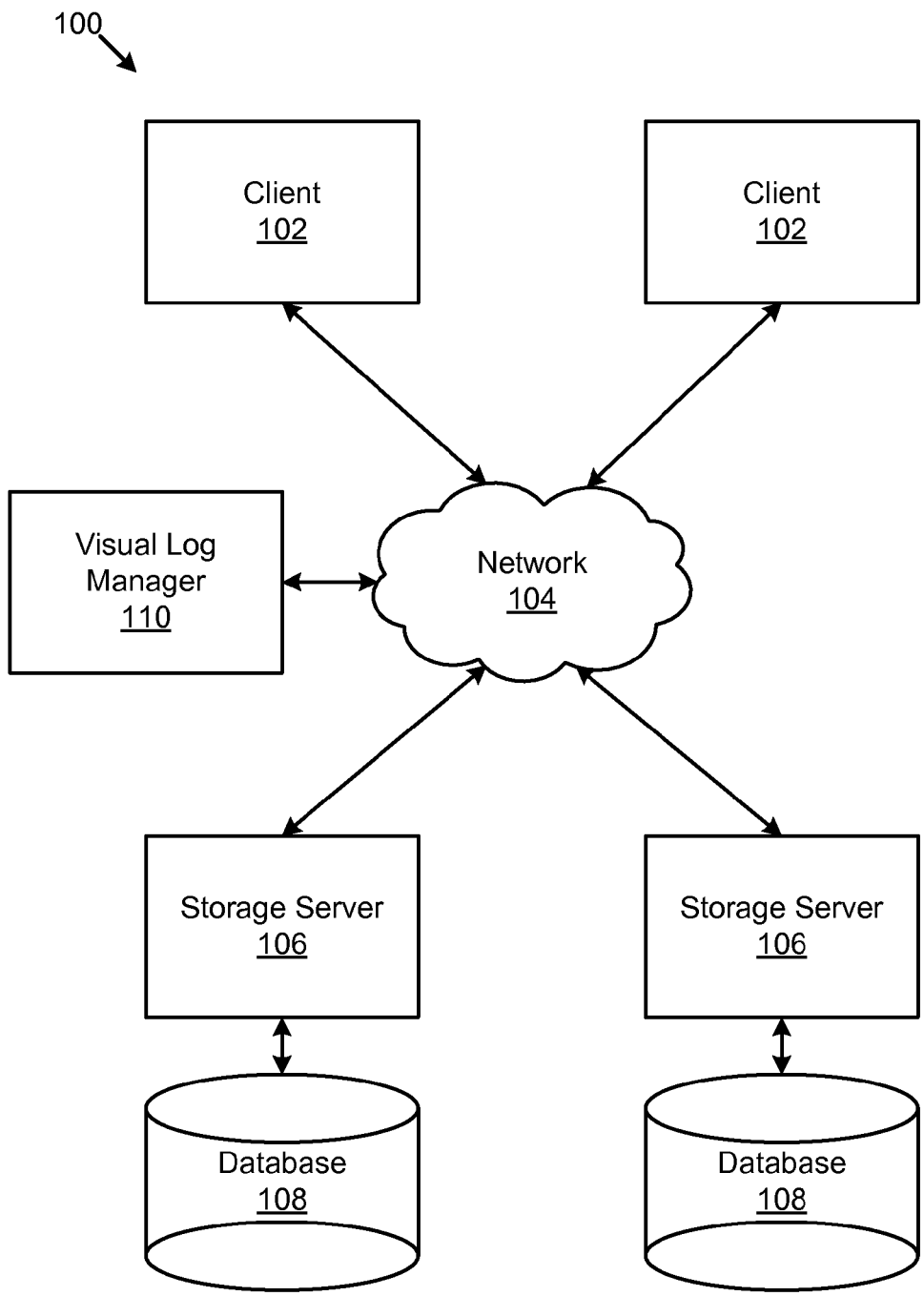
FIG. 1 is a schematic block diagram illustrating one embodiment of a system for visual log analysis.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a system 100 for visual log analysis. The system 100 may include a network 104 of clients 102, servers 106, and databases 108. Additionally, the network 104 may include one or more network management devices, including a visual log manager 110. The visual log manager 110 may be a stand-alone network management device. Alternatively, the visual log manager 110 may be incorporated as a hardware or software module of another network management device.

In one specific embodiment, the visual log manager 110 may include a software application configured to run on a laptop computer, desktop computer, or network server. The hardware platform configured to host a visual log manager 110 software application may include one or more user displays and controls, such as a video monitor, keyboard, or a mouse.

The network 104 may include a Local Area Network (LAN), a Wide Area Network (WAN), a Storage Area Network (SAN), or the like. In one embodiment, computing devices may be coupled to the network via a network compatible routing card, modem, wireless transceiver, or the like. A medium for the network 104 may include Radio Frequency (RF) electromagnetic waves, fiber optics, coaxial cables, twisted pair conductors, or the like. In addition to the devices shown, the network 104 may include one or more network devices (not shown), including network hubs, switches, routers, firewalls, Quality of Service (QOS) devices, or the like.

Some or all of the clients 102, storage servers 106, databases 108, and network devices (not shown) may independently generate logs files. The log files may include records of device status indicators, transactions, process interactions, errors, and the like. These events represent various embodiments of loggable events.

The network devices or applications may include an event identification module (not shown) configured to identify a loggable event. Various embodiments of an event identification module may be used by devices on the network 104. For example, a database 108 may include a software based event identification module. In such an example, the event identification module may recognize one or more preselected transactions or errors as loggable events.

In response to identifying a loggable event, the network device may generate a log entry to document the loggable event. For example, a log entry may include a copy of data involved in the loggable event, a date/time stamp, a device or user identifier for identifying the party responsible for initiating the transaction, and the like. In such an embodiment, the loggable event may be recorded in a log file. The format of the log entries and log file may be product or manufacturer specific.

However, in a further embodiment, the network devices may include a metadata writer (not shown) configured to store metadata information with the log entry. The metadata information may be readable by the visual log manager 110. In such an embodiment, the visual log manager 110 may work with the log entries, regardless of the format of the log entries. Various embodiments of the visual log manager 110 are described in further detail below with reference to FIGS. 2 and 3.

In one exemplary embodiment of the operation of the system 100, a client 102 may host a software application. The software application may generate data for storage on the database 108. In such an example, the client 102 may initiate a data storage transaction with the database 108 by transmitting the data through the network 104 to the data storage server 106. The data storage server 106 may acknowledge the receipt of the data from the client 102. The data storage server 106 may then perform a store transaction with the database 108.

In this example, the software application hosted by the client 102 may generate one or more log entries, the client 102 may also generate one or more log entries, the various network devices (not shown) may each generate various log entries, the storage server 106 may generate log entries and the database 108 may generate log entries. The visual log manager 110 may still receive and understand the various log entries in the various formats because of the metadata stored with the log entries by the metadata writer (not shown).

The metadata writer may be included in a logging software update distributed by a network manager or by various device manufacturers. Alternatively, the metadata writer may be included in a software agent pushed to the various devices on the network 104 by a network manager. The software agent may receive data for log entries and format it with metadata that is readable by the visual log manager 110.

Figure 2:
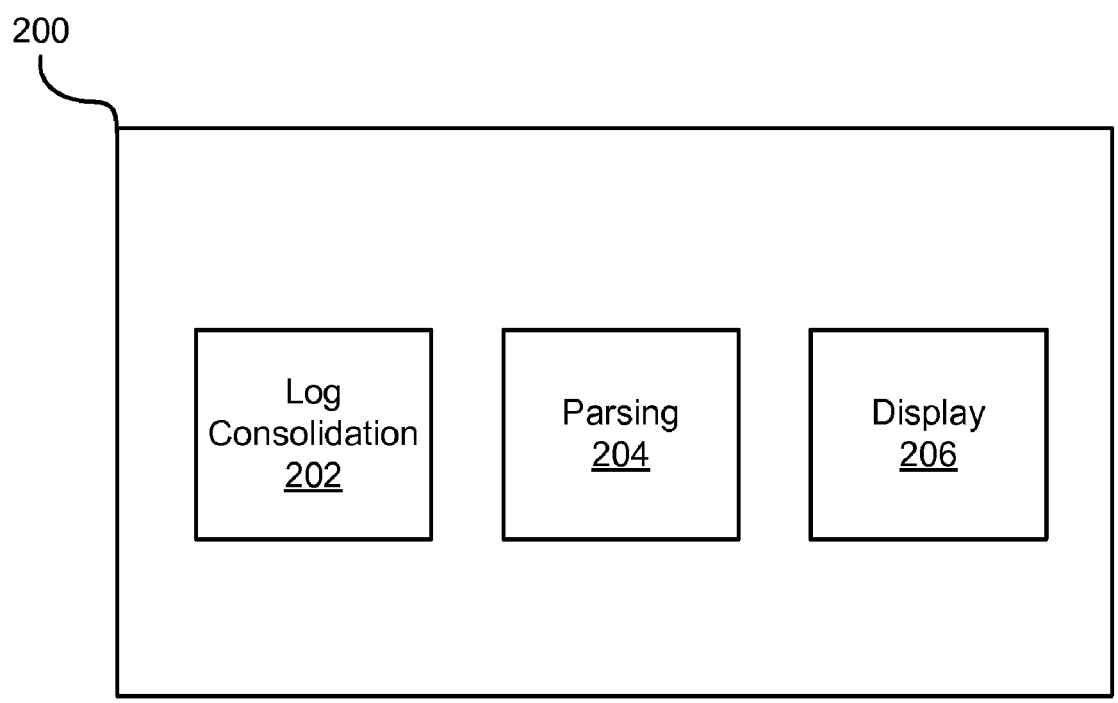
FIG. 2 is a schematic block diagram illustrating one embodiment of an apparatus for visual log analysis.

FIG. 2 illustrates one embodiment of an apparatus 200 for visual log analysis. The apparatus 200 may include a visual log manager 110 as described in FIG. 1. In a further embodiment, the apparatus 200 may include a log consolidation module 202, a parsing module 204, and a display module 206. The log consolidation module 202 may retrieve a plurality of log entries from a plurality of devices on a network 104. The parsing module 204 may parse the log entries to determine a status of the network 104.

The log consolidation module 202 may issue a command to the various devices in the system 100 to retrieve log information. For example, a log consolidation module 202 of the visual log manager 110 may broadcast a global command to all devices on coupled to the network 104 to transmit their respective log files to the visual log manager 110. Alternatively, the log consolidation module 202 may retrieve individual records or groups of records from the various devices using, e.g., a Structured Query Language (SQL) query.

The parsing module 204 may scan the log files obtained by the log consolidation module 202. In one embodiment, the parsing module 204 may search for metadata information stored with the log entries by the metadata writer (not shown). In such an embodiment, the parsing module 204 may be able to identify a status of the network 104 and the various devices coupled to the network 104, including clients 102, servers 106, and databases 108. For example, the parsing module 204 may identify a location of an error, and even the root source of the error based on information contained in the log entries and/or the metadata stored with the log entries.

The display module 206 may display a graphical representation of the status of the network 104. For example, display module 206 may display various transactions or errors logged by the clients 102, the storage servers 106, the databases 108, or the network devices (not shown). In a further embodiment, the display module 106 may additionally display a graphical representation of the various logged events. Various further embodiments of the display module 206 are described with reference to FIG. 4 below.

Figure 3:
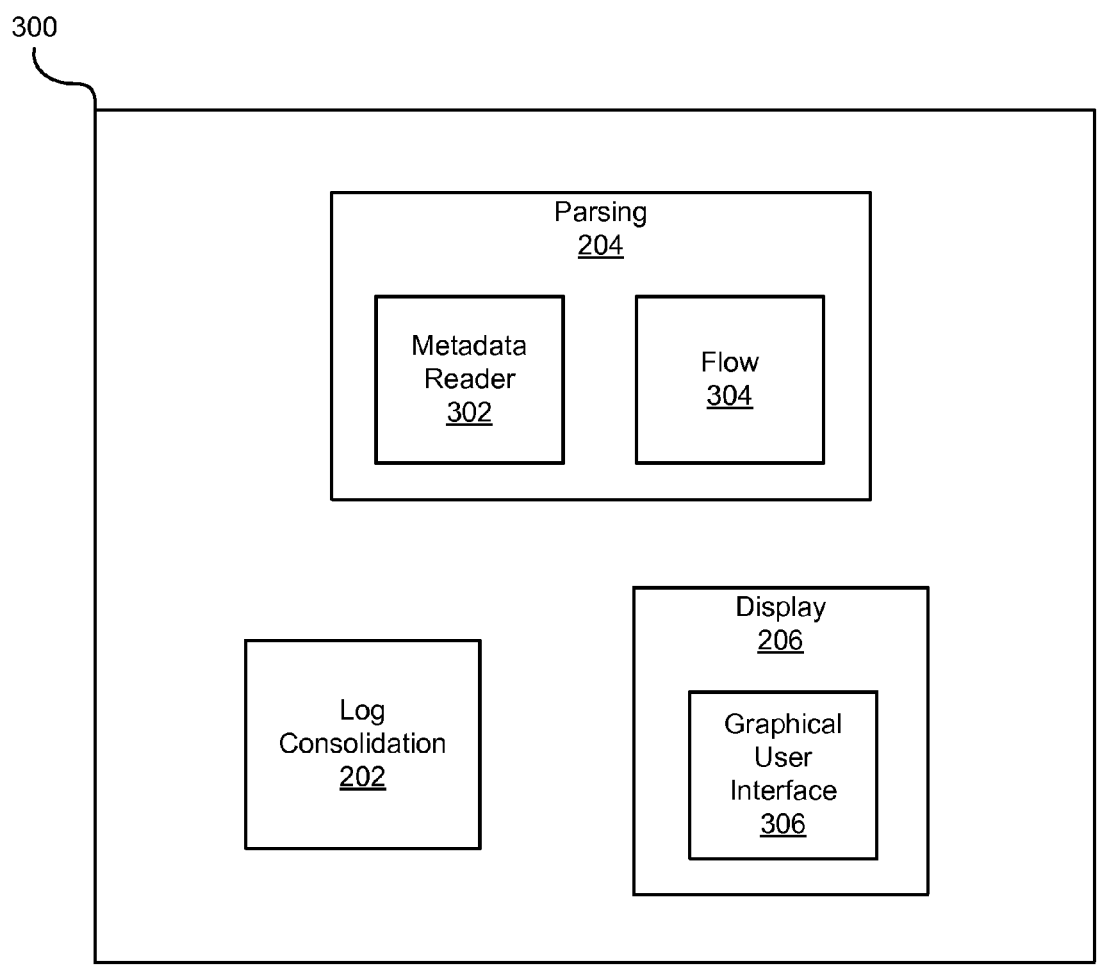
FIG. 3 is a detailed schematic block diagram illustrating one embodiment of an apparatus for visual log analysis.

FIG. 3 illustrates another embodiment of an apparatus 300 for visual log analysis. In this embodiment, the parsing module 204 may include a metadata reader 302. The metadata reader 302 may read the metadata information stored with the log entries by the metadata writer (not shown). In a further embodiment, the metadata reader 302 may identify a topology of the network 104 and associated devices.

The topology information may be derived directly from the metadata stored with the log entries. For example, the metadata writer (not shown) may record one or more device identifiers that uniquely identify the devices involved in the transaction. The metadata reader 302 may read these identifiers to determine a relationship between the devices. Alternatively, the log entries may provide some topology information based on the information recorded in the log entry.

The parsing module 204 may also include a flow module 304. The flow module 304 may identify a flow of interactions between the devices on the network 104. For example, the metadata may include date/time stamps that indicate the date and time a log entry was generated. The flow module 304 may identify a chronological flow of interactions, including operations and errors occurring on the device by tracking the timing of the log entries.

The display module 206 may include a graphical user interface module 306. The graphical user interface module 306 may take information collected by the parsing module 204 and display it in a visual representation of the network and log files for viewing and analysis by a user. For example, the graphical user interface module 306 may use topology information collected by the parsing module 204 to produce a topographical map of the network 104 and associated components. In a further embodiment, the graphical user interface module 306 may display graphical representations of transactions or errors that occur on the network 104.

Figure 4:
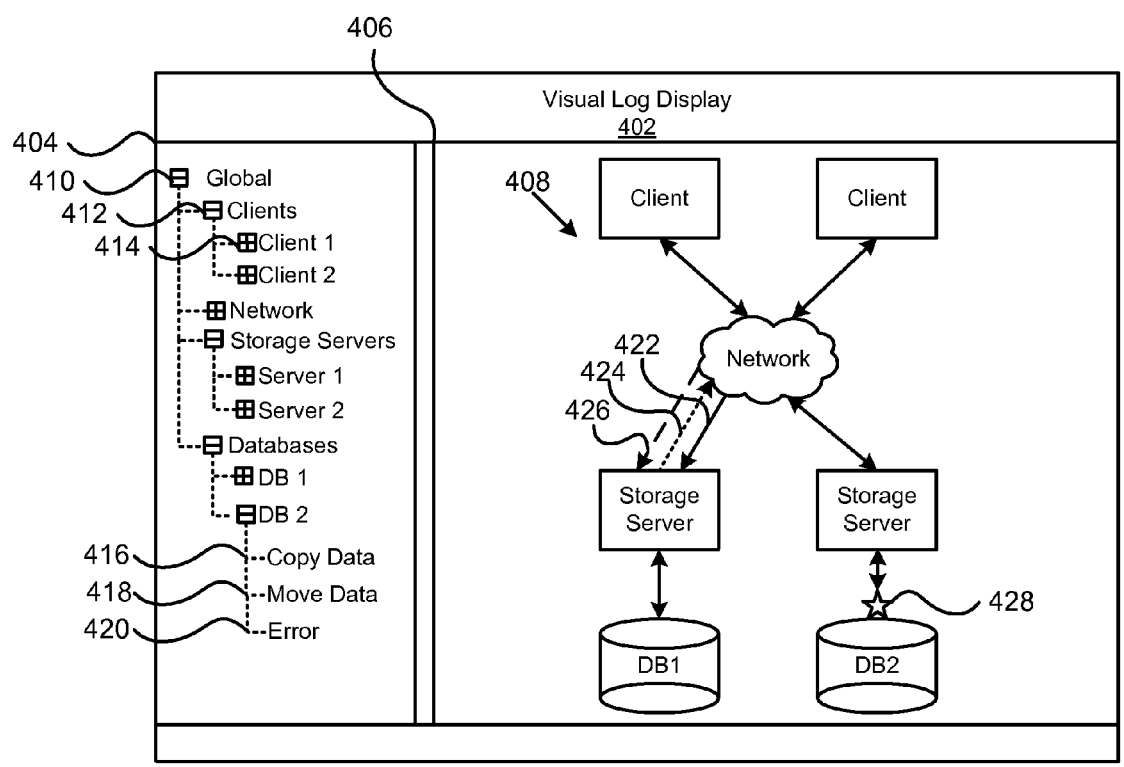
FIG. 4 is a screen shot view illustrating one embodiment of visual log display.

FIG. 4 illustrates one embodiment of a visual log display 402 that may be generated by the graphical user interface 306 module. In the depicted embodiment, the visual log display 402 may include a list view panel 404. The visual log display 402 may also include a topography view panel 406. The topography view panel 406 may include a graphical representation 408 of the network 104 and associated components. Additionally, the topography view panel 406 may include various graphical representations 422-428 of transactions and errors.

The list view panel 404 may include a hierarchical list of system objects and logged transactions and errors associated with each device. For example, the entire system 100 may be included in a global group 410. The global group 410 may include an expandable list of the types of devices on the network 104. When the global group 410 is expanded, a listing of device groups 412 may be viewed. In the depicted embodiment, the global group 410 includes a client group 412, a network group, a storage server group, and a database group.

The device group 412 may also expand into a component list 414. The component list may identify individual components of the system 100. For example, in the depicted embodiment, the clients group 412 includes a first client 102 and a second client 102. The individual components may be expended for a list of logged events associated with that device. For example, the database labeled as DB2 may include a list of several logged events including a copy data transaction 416, a move data transaction 418 and database error 420. In a further embodiment, the logged event may be clicked to reveal detailed information regarding the event.

The topography view panel 406 may display another representation of the logged events. For example, the topographical map may include one or more lines 422-426 between components representing logged events. In one embodiment, a line representing one type of logged event may be different than a line representing another type of logged event. For example, the lines may be different colors or textures. In the depicted example, the line 422 may represent a data storage transaction between the network 104 and the storage server 106. In this embodiment, the direction of the arrow on the line 422 indicates the direction of the flow of data.

In a further embodiment, the flow or chronology of the logged events may be illustrated. For example, the relative placement of the lines 422-426 may indicate the timing of the logged events. In the depicted example, the transaction represented by line 422 may occur before the transaction represented by lines 424 and 426. In a further embodiment, the topology view panel 406 may include identifiers indicating that an error has occurred on a particular device. For example, in the depicted embodiment, the star 428 may indicate that an error 420 has occurred on DB2. The lines and identifiers on the topology view panel 406 may correspond to transactions and error listed in the list view panel 404.

Beneficially, the visual log display may provide a network administrator with a more intuitive view of log entries. For example the network administrator may quickly identify an error 420 on the topography view panel 406, and then may drill down to view more detail regarding the error 420 using the list view panel 404.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
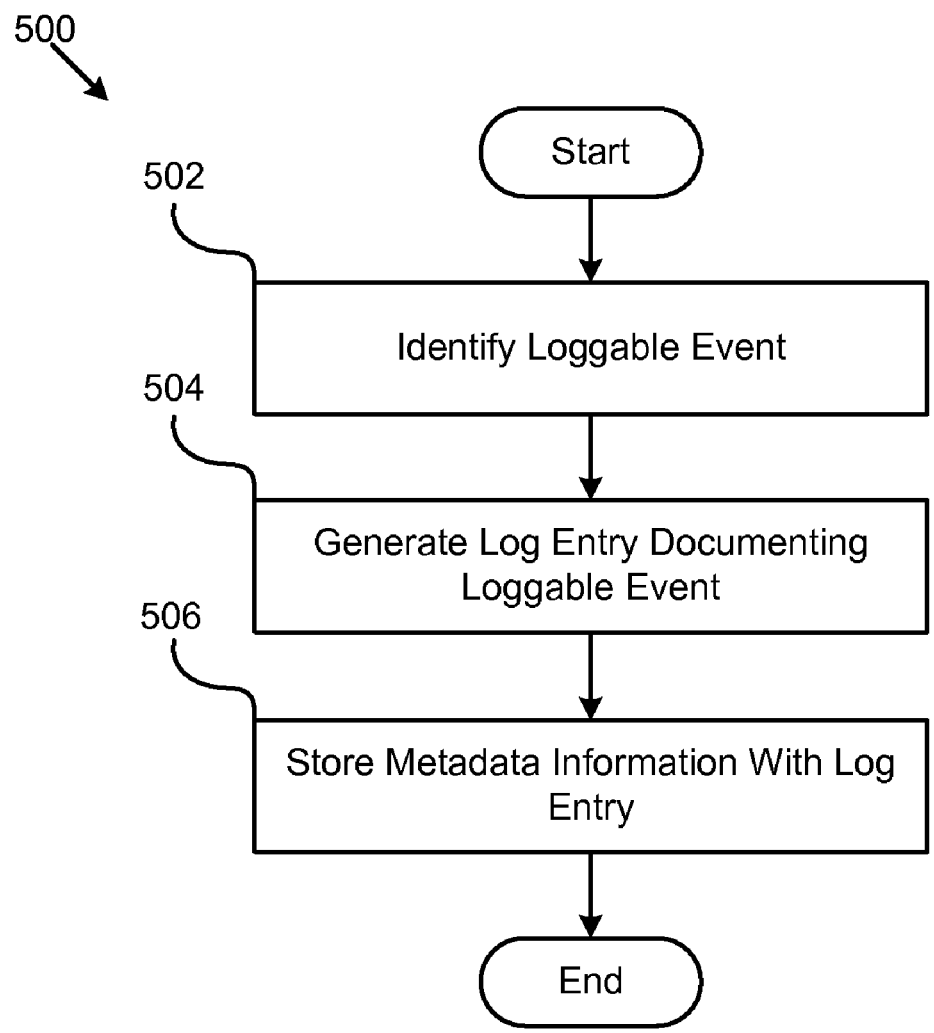
FIG. 5 is a schematic flow chart diagram illustrating one embodiment of a method for visual log analysis.

FIG. 5 illustrates one embodiment of a method 500 for visual log analysis. The depicted method starts when an event identification module (not shown) of a device on the system 100, such as a client 102, identifies 502 a loggable event. The client's 102 log generator (not shown) may then generate 504 a log entry to document the loggable event. In such an embodiment, a metadata writer (not shown) may store 506 metadata information with the log entry, so that the visual log manager 110 may accurately parse log entries stored in various different formats.

Figure 6:
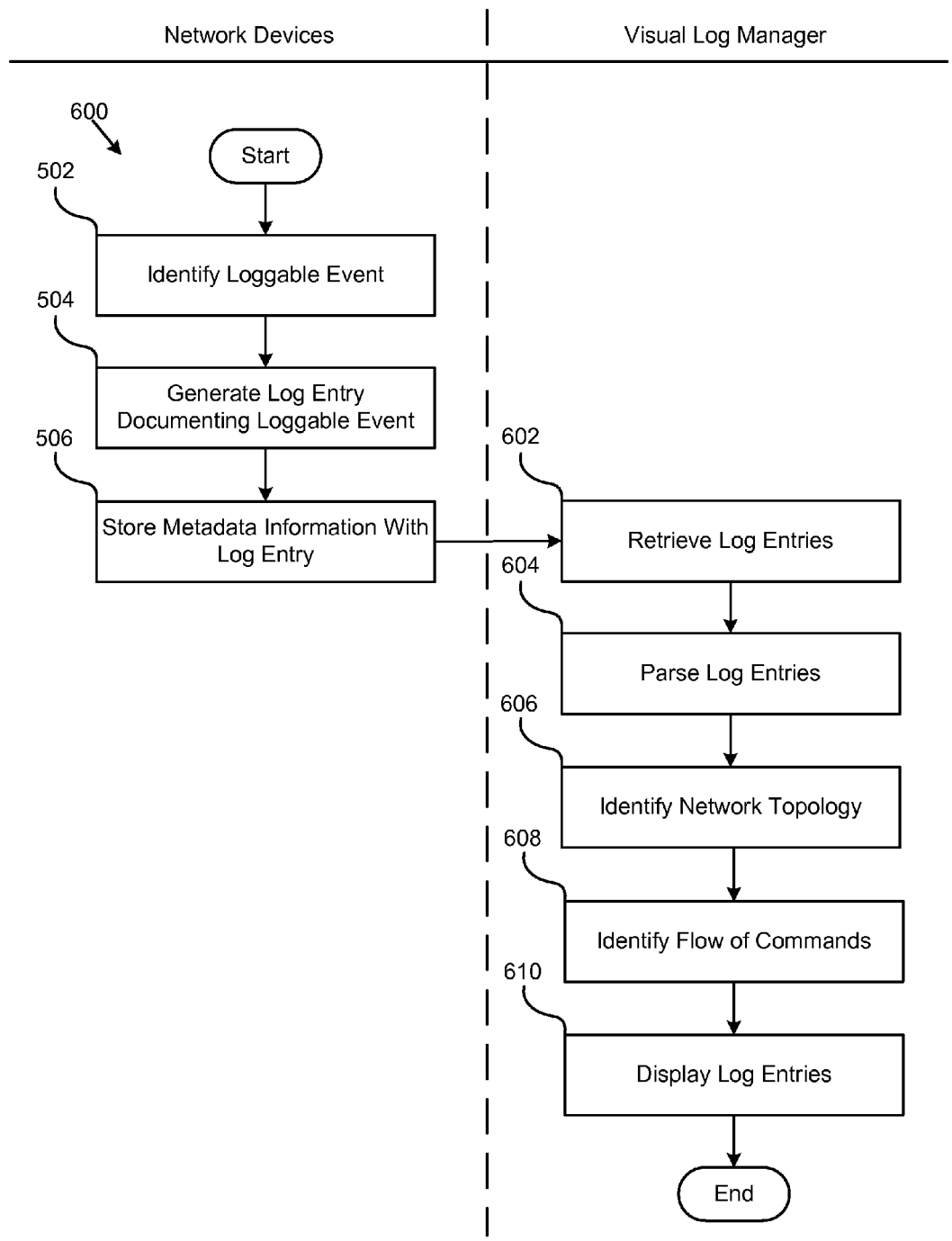
FIG. 6 is a detailed schematic flow chart diagram illustrating one embodiment of a method for visual log analysis.

For example, in the method 600 illustrated in FIG. 6, starts when one of the devices in communication with the network 104, including a client 102, a storage server 106, or a database 108 identifies 502 a loggable event. The device may then generate 504 a log entry to document the loggable event. In such an embodiment, the device may store 506 metadata information with the log entry.

In the depicted embodiment, the visual log manager 110 may then retrieve 602 log entries from the devices on the network 104. Specifically, a log consolidation module 202 may retrieve 602 the log entries. A parsing module 204 on the visual log manager 110 may parse 604 the log entries to determine a status of the network 104.

In a further embodiment, a flow module 304 may identify 606 a topology of the network 104. The metadata reader 302 may also identify 608 the flow or sequence of transactions, commands, or errors on the network 104. Finally, the display module 206 of the visual display module 110 may display 610 a graphical view of the log entries. For example, the display module 110 may include a graphical user interface module 306 configured to display 610 the visual log display 400 illustrated in FIG. 4.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for visual log analysis, the apparatus comprising:
   a processor; a memory in communication with the processor, the memory storing modules for execution by the processor, the memory comprising,
   a log consolidation module executable on the processor configured to retrieve, from each of a plurality of devices on a network, a plurality of log entries from a log maintained by the device and to consolidate the plurality of log entries, each of the plurality of devices maintaining a distinct set of log entries corresponding to loggable events associated with the device, wherein metadata information is generated and stored with a log entry in response to creation of the log entry, the metadata information executable on the processor configured to identify a topology relationship between the device that generated the log entry and other network devices;
   a metadata reader module executable on the processor configured to read the metadata information stored with the log entries, the stored metadata identifying a topology relationship between the device that generated the log entry stored with the metadata and the other network devices;
   a parsing module in communication with the log consolidation module, the parsing module executable on the processor configured to parse the log entries retrieved from each of the plurality of devices based on the metadata stored with the log entries to identify log entries from different devices on the network that are related based on the topology relationship identified by the metadata,
   wherein the parsing module is executable on the processor further configured to parse the log entries stored in a plurality of formats by the plurality of devices on the network, the log entries comprising a copy of data involved in a loggable event, a date/time stamp, and a device or user identifier: and
   a display module in communication with the parsing module, the display module configured to display a graphical representation of the log entries.

2. The apparatus of claim 1, wherein the stored metadata comprises one or more device identifiers that uniquely identify a device that generated the metadata and its corresponding log entry.

3. The apparatus of claim 2, where in the display module further comprises a graphical user interface module executable on the processor configured to graphically display the topology of the plurality of devices on the network.

4. The apparatus of claim 1, wherein the parsing module further comprises a flow module executable on the processor configured to identify a flow of interactions between the plurality of devices on the network.

5. The apparatus of claim 4, wherein the display module executable on the processor is further configured to display the flow of interactions between the plurality of devices on the network identified by the flow module.

6. A system for visual log analysis, the system comprising:
a network;
a plurality of devices in communication with the network and configured to: identify a loggable event; generate a log entry documenting the loggable event, wherein metadata information is generated and stored with a log entry in response to creation of the log entry, the metadata information executable on a processor configured to identify a topology relationship between the device that generated the log entry and other network devices; and store metadata information with the log entry, wherein the metadata information executable on a processor is configured to be readable by a visual log manager; and
a visual log manager in communication with the network, the visual log manager comprising a processor and a memory, the visual log manager configured to: retrieve, from each of the plurality of devices in communication with the network, log entries from a log maintained by the device and consolidate the plurality of log entries, each of the plurality of devices maintaining a distinct set of log entries corresponding to loggable events associated with the device;
read the metadata information stored with the log entries, the stored metadata identifying a topology relationship between the device that generated the log entry stored with the metadata and the other network devices;
parse the log entries retrieved from each of the plurality of devices based on the metadata stored with the log entries to identify log entries from different devices on the network that are related based on the topology relationship identified by the metadata, wherein the log entries are stored in a plurality of formats by the plurality of devices on the network, the log entries comprising a copy of data involved in a loggable event, a date/time stamp, and a device or user identifier; and display a graphical representation of the log entries.

7. The system of claim 6, wherein the stored metadata comprises one or more device identifiers that uniquely identify a device that generated the metadata and its corresponding log entry.

8. The system of claim 7, where in the visual log manager is further configured to graphically display the topology of the plurality of devices on the network.

9. The system of claim 6, wherein the visual log manager executed on the processor is further configured to identify a flow of interactions between the plurality of devices on the network.

10. The system of claim 9, wherein the visual log manager executed on the processor is further configured to display the flow of interactions between the plurality of devices on the network.

11. A method for visual log analysis, the method comprising:
retrieving log entries from each of a plurality of devices on a network and consolidating the plurality of log entries, each of the plurality of devices maintaining a distinct set of log entries corresponding to loggable events associated with the device, the retrieving accomplished by use of a processor, wherein metadata information is generated and stored with a log entry in response to creation of the log entry, the metadata information configured to identify a topology relationship between the device that generated the log entry and other network devices;
reading the metadata information stored with the log entries, the stored metadata identifying a topology relationship between the device that generated the log entry stored with the metadata and the other network devices;
parsing the log entries retrieved from each of the plurality of devices based on the metadata stored with the log entries to identify log entries from different devices on the network that are related based on the topology relationship identified by the metadata, wherein the log entries are stored in a plurality of formats by the plurality of devices on the network, the log entries comprising a copy of data involved in a loggable event, a date/time stamp, and a device or user identifier; and displaying a graphical representation of the log entries.

12. The method of claim 11, wherein the stored metadata comprises one or more device identifiers that uniquely identify a device that generated the metadata and its corresponding log entry.

13. The method of claim 12, further comprising graphically displaying the topology of the plurality of devices on the network.

14. The method of claim 11, further comprising identifying a flow of interactions between the plurality of devices on the network.

15. The method of claim 14, further comprising displaying the flow of interactions between the plurality of devices on the network.

16. The method of claim 11, further comprising: identifying a loggable event; generating a log entry documenting the loggable event; and storing metadata information with the log entry, wherein the metadata information is configured to be readable by a visual log manager comprising a processor and a memory.

17. A method for visual log analysis, the method comprising:
identifying a loggable event; generating a log entry documenting the loggable event, wherein metadata information is generated and stored with the log entry in response to creation of the log entry, the metadata information configured to identify a topology relationship between the device that generated the log entry and other network devices;
storing metadata information with the log entry, wherein the metadata information is configured to be readable by a visual log manager, and wherein the metadata comprises one or more device identifiers that uniquely identify a device that generated the metadata and its corresponding log entry;

retrieving, from each of a plurality of devices on a network, log entries from a log maintained by the device and consolidating the plurality of log entries, each of the plurality of devices maintaining a distinct set of log entries corresponding to loggable events associated with the device, the retrieving accomplished by use of a processor;

reading metadata information stored with the log entries, the stored metadata identifying a topology relationship between the device that generated the log entry stored with the metadata and the other network devices;

parsing the log entries to determine retrieved from each of the plurality of devices based on the metadata stored with the log entries to identify log entries from different devices on the network that are related based on the topology relationship identified by the metadata, wherein the log entries are stored in a plurality of formats by the plurality of devices on the network, the log entries comprising a copy of data involved in a loggable event, a date/time stamp, and a device or user identifier: and displaying a graphical representation of the log entries.

* * * * *